United States Patent [19]

Dunn et al.

[11] 4,282,019
[45] Aug. 4, 1981

[54] GLASS MANUFACTURING PROCESS WITH IN-SITU COLEMANITE CALCINATION AND POLLUTION ABATEMENT FEATURES

[75] Inventors: Charles S. Dunn, Pataskala; Mark A. Propster, Gahanna, both of Ohio

[73] Assignee: Owens-Corning Fiberglas Corporation, Toledo, Ohio

[21] Appl. No.: 149,097

[22] Filed: May 12, 1980

[51] Int. Cl.³ .............................................. C03B 3/00
[52] U.S. Cl. ........................................ 65/27; 65/335; 106/54; 106/DIG. 8
[58] Field of Search ...................... 65/27, 335; 106/54, 106/DIG. 8

[56] References Cited

U.S. PATENT DOCUMENTS

| | | | |
|---|---|---|---|
| 3,309,170 | 3/1967 | Griswold | 23/59 |
| 3,865,541 | 2/1975 | Wilson et al. | 432/13 |
| 4,042,667 | 8/1977 | Ishiwata et al. | 55/71 |
| 4,074,990 | 2/1978 | Brzozowski et al. | 65/27 |
| 4,135,904 | 1/1979 | Suzuki et al. | 65/335 |
| 4,184,861 | 1/1980 | Erickson et al. | 65/27 |
| 4,225,332 | 9/1980 | Tsay | 65/27 X |

OTHER PUBLICATIONS

"SO₂ Pickup by Limestone and Dolomite Particles in Flue Gas," Apr., 1970, Journal of Engineering for Power, pp. 113-122.
"Kinetics of the Reaction of SO₂ with Calcined Limestone," Jan., 1970, Environmental Science and Technology, vol. 4, No. 1, pp. 59-63.

Primary Examiner—Arthur D. Kellogg
Attorney, Agent, or Firm—Ronald C. Hudgens; Robert F. Rywalski

[57] ABSTRACT

Raw colemanite is introduced into the flue gas stream emanating in a combustion-fired furnace, which flue gas stream will contain boron values and if the glass being manufactured contains fluorine, will also containe fluorine values. This introduction provides for the calcination of the raw colemanite and likewise provides for pollution abating features by a reaction with the boron values and the fluorine values.

6 Claims, 1 Drawing Figure

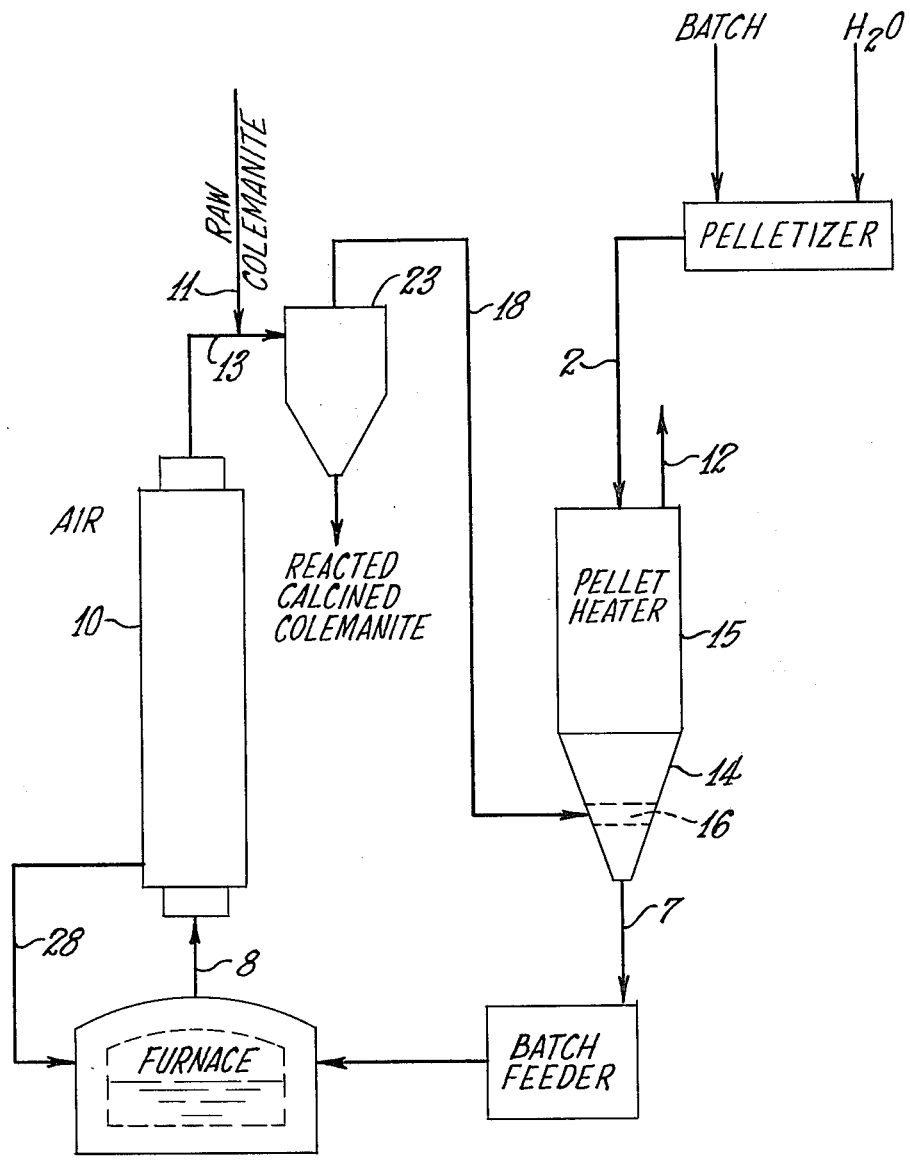

GLASS MANUFACTURING PROCESS WITH IN-SITU COLEMANITE CALCINATION AND POLLUTION ABATEMENT FEATURES

TECHNICAL FIELD

The present invention relates to the art of glass manufacturing. More particularly, this invention relates to a process which minimizes atmospheric pollution while also providing for the calcination of a needed raw material.

BACKGROUND AND SUMMARY

Glass manufacturing process are known for producing $B_2O_3$ and CaO containing glasses and which glasses can, optionally, include fluorine. Numerous such glasses have been produced in the past by supplying batch ingredients including calcined colemanite to a combustion-fired glass melter and melting the ingredients in the melter while withdrawing the flue gases from the furnace and passing them through a heat exchanger, e.g., a regenerator or recuperator. Such gases will contain boron values and when fluorine is present in the glass, they will likewise include fluorine values.

One such process is disclosed in U.S. Pat. No. 4,184,861 which is hereby incorporated by reference. Such patent discloses a process for producing a calcia and boric oxide containing glass, which glass can optionally include fluorine, in a combustion fired melter. The process comprises converting glass forming batch ingredients, including calcined colemanite, into agglomerates, heating a bed of such agglomerates in a chamber by direct contact with flue gases so as to produce heated, non-aggregated agglomerates which agglomerates are then supplied to the melter. The gases which are employed for the direct heating of the bed originate in the melter and have been cooled in a heat exchanger prior to such direct contact. These gases will contain boron values and, when fluorine is present in the glass being manufactured, they will likewise include fluorine values. Such gases after they have passed through the heat exchanger, e.g., a recuperator or regenerator, typically will have a temperature of about 1400° F.–1500° F. (about 760° C.–816° C.). More generally, however, they will typically have a temperature in excess of about 800° F. (427° C.).

As the gases pass through the bed of agglomerates, they not only heat the agglomerates, thereby salvaging some of the sensible heat in such gases, but a pollution abating feature is also realized in that some of the pollutants are separated in the bed by a complex physiochemical mechanism. Additionally it is known that raw colemanite, rather suddenly and violently, releases its chemically bound water, i.e., it decrepitates. Such descepitation generally occurs at a temperature of about 390° C.–410° C. This decrepitation is sufficiently violent that it can cause severe dusting problems even in a particulate batch. When agglomerates are employed, however, the decrepitation causes a more severe problem, in that it causes the agglomerates to disintegrate. In the past, colemanite was either purchased, as calcined colemanite, or prior to usage the raw colemanite was separately treated by heating it above its decrepitation temperature to release substantially all of its chemically bound water, or water of crystalization. In either case, it will be appreciated that the glass manufacturing process was detrimentally impacted upon in that the cost of raw materials is increased by the necessary procurement of such calcined colemanite.

With the foregoing in mind, the present invention has as its object to decrease the raw material costs of such a process and substantially simultaneously enhance the pollution abating characteristics by providing for the recovery of some of the boron values and, when fluorine is present in the glass, for the recovery of fluorine values. More specifically, the present invention provides for the substantially simultaneous calcination of colemanite and a reaction to minimize the amount of boron values, and when present, fluorine values, which previously would need to have been separated in the bed of agglomerates or by various types of pollution abating equipment, for example, scrubbers, cyclones or baghouses.

The foregoing is accomplished by introducing raw colemanite into the flue gases, after they have been cooled in the heat exchanger, but prior to their being employed to heat the bed of agglomerates. Since these gases will, as indicated above, have a temperature which is in excess of the decrepitation temperature of raw colemanite, a decrepitated, or calcined, colemanite will be produced. Substantially contemporaneously with the formation of such decrepitated colemanite will be a reaction between the boron values in such flue gass and, when fluorine is present in the glass, a reaction of fluorine values will also occur. The exact sequence of events is not presently known, but it will be found that such reaction does occur. More specifically, it is not known whether such reaction will occur prior to the raw colemanite having reached its decrepitation temperature or whether it will occur substantially at such decrepitation temperature or whether it will occur subsequent to the colemanite having been heated above its decrepitation temperature. Consequently, as used herein, the terminology that a boron reacted, and when present, fluorine reacted calcined, or decrepitated, colemanite is formed comprehends any of the above possible sequences. The solid, boron reacted and, when present, fluorine reacted calcined, or decrepitated, colemanite is separated from the gas stream, preferably by a cyclone, prior to then heating a bed of agglomerates of glass forming batch material with such gases. Thus, it will be seen that in this manner the raw colemanite is converted into a suitably usable calcined form and likewise, some of the pollutants are recovered and recycled as raw materials into the batch. In this way, there is a favorable impact on the economics of the glass manufacturing process. Similarly, since some of the pollutants will be recovered prior to passing of the gases through the bed, it will be appreciated that pollution abatement features will be enhanced since the bed now, instead of operating as a primary pollution abatement device, will serve more in the nature of a secondary or polishing pollution abatement device.

The terminology "boron values" and "fluorine values" comprehends within the scope of any of the compounds existing in a glass manufacturing process which contain boron or fluorine and includes elemental forms thereof. Exemplary of such compounds are $H_3BO_3$, $HBO_2$, $HF$, $BF_3$.

THE DRAWING

The attached drawing schematically illustrates a technique for industrially exploiting the present invention.

DESCRIPTION

While the preferred practice of the present invention resides in the utilization of agglomerates in the form of pellets, any agglomerates may be employed. Such agglomerates are composite, integral, self-supporting masses consisting essentially of all the substantial batch materials and may take the form of balls, extrusions, discs, briquettes, and the like. Additionally, the present invention may be practiced with any glass which contains calcia (CaO), boric oxide ($B_2O_3$), and, optionally, fluorine. When such glasses contain greater than about 5% by weight $Na_2O$ it is preferred to dry and preheat such agglomerates in accordance with U.S. Ser. Nos. 095,870 and 095,871. The present invention is outstandingly adapted for use in producing fiberizable textile glasses. These glasses are low alkali metal oxide containing glasses, for example glasses containing, if at all, less than 3% by weight of alkali metal oxides and more typically less than 1% by weight. The present invention is especially well-adapted to the manufacture of an E-type glass which may be categorized as an alkaline earth boroaluminosilicate glass. Such latter glasses typically contain fluorine in an amount of about 1% by weight or less (as $F_2$), but it should be mentioned in passing that the amount of fluorine in the glass produced by the present process is not critical.

Referring now to the drawing, it will be seen that glass forming batch materials and water are converted into individual agglomerates, preferably pellets which are produced on a rotating disc pelletizer. Preferably, the glass being formed will be an E-glass with an exemplary E-glass batch composition being set forth in the above-incorporated U.S. Pat. No. 4,184,861. The free water content of the pellets may be about 10-20% by weight and while not shown, the pellets may be subjected to a screening operation to select pellets of a nominal size of about ⅜ inch to ⅝ inch in diameter. These pellets are then transported by suitable means such as a belt conveyor 2 and supplied to a chamber or pellet heater 15 which maintains a vertical bed of pellets therein. Pellets generally move gravitationally downwardly in the bed of the pellet heater 15 and are discharged therefrom as hot individual pellets and supplied by a duct member 7 to a batch charger which conveys them to a combustion fuel fired glass melting furnace. The combustion, or flue, gases from the melting furnace are conveyed by suitable means 8, for example a duct, to a heat exchanger, for example a recuperator 10, where they are indirectly cooled with air, for example from a temperature typically on the order of about 2600° F. (1427° C.) to a temperature on the order of about 1400° F.–1500° F. (760° C.–816° C.). The heated air 28 is then supplied to the furnace burners for use as combustion make-up air. Such cooled flue gases are then conveyed by a suitable duct 11 to a cyclone separator 23 with the gases from the cyclone separator then being supplied by a duct 18 to pellet heater 15. The gases flow through the pellet heater 15 in direct countercurrent contact with the pellets therein to dry the pellets and preheat them to an elevated temperature, which will be above the decrepitation temperature of raw colemanite and preferably a temperature in excess of at least about 500° C. The flue gases leave the pellet heater by a suitable outlet generally designated 12. If desired, such flue gases may be further processed as by passage through a cyclone or bag collector. Preferably, the flue gases will be supplied to the pellet heater by a manifold type arrangement with entrances into the heater being on diametrically opposed sides of a lower frusto-conical portion 14. In accordance with sound engineering practices, the gases will be distributed generally uniformly across the heater as by employing an inverted V-shaped member 16 which spans frusto-conical portion 14. Desirably chamber 15 will be designed with certain criteria in mind. First of all, as exemplified in the drawing, the pellet preheater will include an upper cylindrical portion and a lower frusto-conical portion. Generally, considering the diameter of the cylindrical portion as D, the height of the cylindrical portion should be about 1-2 times D and the height of the frusto-conical portion should be about one and one-half times D. The inverted "V" shaped gas distributor 16 should generally be located in the frusto-conical portion so that the area under the inverted "V" is about 50% of the total conical cross section at that position, with the height of the pellet bed being maintained at least about 0.3–0.5 times D above the flow distributor. Additionally, it will be desirable that the included angle between diametrically opposed sidewall portions of the lower frusto-conical portion 14 be approximately 30–45 degrees, and preferably 35 or 36 degrees. Generally it is preferred that the superficial velocity of the flue gases through the cylindrical portion with a diameter D be between about 20 to 60 standard feet per minute.

Raw colemanite is introduced into duct 13 by any suitable means 11 such as, for example, a volumetric screw conveyor. Upon contact with the flue gases, the raw colemanite will be heated, and since the E-glass being manufactured will contain fluorine, the flue gases will contain boron and fluorine values. In a very short time interval, for example on the order of several minutes or less, the interaction between the heat of the flue gases and the boron values and fluorine values in the flue gases will cause the formation of a solid, boron reacted and fluorine reacted, calcined, or decrepitated, colemanite. Such solid boron reacted and fluorine reacted calcined colemanite is then separated from the gas stream in a cyclone 23 with the cleansed flue gases then being supplied, as indicated, by duct 18 to preheater 15. The reacted calcined colemanite is recovered from the cyclone and then is recycled and used as a batch ingredient. In this way, a needed raw material, i.e., the calcined species is produced and substantially simultaneously an initial pollution abating reaction takes place to separate and recycle boron and fluorine values. Thus, any remaining boron and fluorine values are transmitted to the secondary pollution abating step, namely the pellet heater for recovery therein. The amount of raw colemanite which is introduced by the feeder 11 will, of course, vary with different installations. Generally, however, it will be preferred that the amount and size of the raw colemanite employed be only limited by the fact that it is desired to be able to substantially pneumatically convey the raw colemanite and the reacted calcined colemanite in the gas stream. This will likewise substantially insure that the drop in temperature will not be so great that the benefits of preheating the agglomerates in the preheater will not be economically realized. Generally, it will be preferred that the ratio of the rate (pounds per hour) of colemanite addition (based on the CaO content thereof) to the rate of total born (and fluorine when present) flowing in the flue gases in duct 13 will be at least about 4:1, preferably at least 5-10 times that ratio or even higher. It is also highly desirable that the flue gases to which the raw colemanite is added have substantially the same absolute humidity as those leaving recuperator 10. That is, the flue gases are not evaporatively cooled, as by spraying water into them upon exit from the recuperator.

While the above sets forth the present invention, it will, of course, be apparent that modifications are possible which pursuant to the patent statutes and laws do not depart from the spirit and scope thereof.

We claim:

1. In a glass manufacturing process for producing a $B_2O_3$ containing glass, which glass optionally includes fluorine, comprising supplying batch ingredients, including calcined colemanite, to a combustion fired glass melter and melting said ingredients therein while withdrawing flue gases from said furnace and passing them through a heat exchanger, said gases containing boron values, and fluorine values when fluorine is present in said glass, the improvement comprising introducing raw colemanite into said gases after passage through said heat exchanger and heating said colemanite for a sufficient period of time to form a boron and, when present, fluorine reacted, decrepitated colemanite, and separating said reacted, decrepitated colemanite from said gas.

2. The improvement of claim 1 wherein said separating is done with a cyclone.

3. The improvement of claim 1 and further comprising using said reacted, decrepitated colemanite as a batch ingredient.

4. In a process for producing a calcia and boric oxide containing glass, said glass optionally containing fluorine, in a combustion fired melter comprising, converting glass forming batch ingredients, including calcined colemanite, into agglomerates, heating a bed of said agglomerates in a chamber by direct contact with flue gases so as to produce heated, non-aggregated agglomerates, said gases originating in said melter and containing boron values and also fluorine when said glass contains fluorine and having been cooled in a heat exchanger prior to said direct contact heating, and supplying said heated agglomerates to said melter, the improvement comprising introducing raw colemanite into said flue gases prior to heating said bed with said gases and allowing said raw colemanite to form a solid, boron reacted, and, when present, fluorine reacted, calcined colemanite, and separating said calcined colemanite from said gases prior to heating said bed with said gases.

5. The improvement of claim 4 and further including using said separating colemanite as a batch ingredient.

6. The process of claim 4 wherein said glass contains fluorine in an amount of 1% by weight, or less (as $F_2$).

* * * * *